United States Patent Office 3,494,906
Patented Feb. 10, 1970

3,494,906
VINYL HALIDE POLYMERIZATION PROCESS
Elliott Farber, Trenton, N.J., assignor to Tenneco Chemicals, Inc., a corporation of Delaware
No Drawing. Filed Dec. 12, 1967, Ser. No. 689,766
Int. Cl. C08f 1/06, 3/30, 1/62
U.S. Cl. 260—87.1
12 Claims

ABSTRACT OF THE DISCLOSURE

When vinyl halide monomer mixtures containing both fresh monomers and monomers recovered from a previous polymerization are polymerized in the presence of a small amount of a reducing agent, such as sodium bisulfite, the polymerization reaction time and the degree of conversion achieved are substantially equivalent to those obtained using monomer mixtures that contain only fresh or purified monomers.

---

This invention relates to a process for the production of vinyl halide polymers. More particularly, it relates to a cyclic, unitary process for the preparation of vinyl halide polymers in which unreacted monomers recovered from a polymerization reaction are used without purification in a subsequent polymerization reaction.

When a vinyl halide is polymerized alone or in the presence of a comonomer, such as vinyl acetate, about 90 percent to 97 percent of the monomer component is converted to the polymer. The unreacted 3 percent to 10 percent of the monomer component is usually recovered in commercial processes by condensation techniques. The recovered monomers contain small amounts of by-products that are produced during the ploymerization reaction and that are generally removed by distillation or other known procedures prior to the reuse of the recovered monomers because they tend to reduce the efficiency of the free radical generating polymerization initiators. When the recovered monomers are used without purification in a polymerization reaction, there is a sizeable increase in the time required to reach the usual 90 percent to 97 percent conversion of the monomers to polymer; in those cases in which relatively large amounts of the contaminating polymerization by-products are present, this degree of conversion cannot be attained. This decrease in the rate of polymerization and in the total conversion is undesirable because it reduces the productivity of the polymerization equipment and increases the cost of the product. Purification of the recovered monomers, for example, by distillation also adds to the cost of the product.

In accordance with this invention, it has been found that the rate of polymerization of a mixture of monomers including a major amount of a vinyl halide and containing both fresh monomers and unpurified monomers recovered from previous polymerizations can be increased appreciably by incorporating in the monomer mixture a small amount of a reducing agent. When monomer mixtures containing both fresh monomer and unpurified recovered monomer are treated in accordance with the process of this invention, their rates of polymerization and degrees of conversion are substantially equivalent to those of monomer mixtures that contain either only fresh monomer or fresh monomer and purified recovered monomer.

In a preferred embodiment of this invention, vinyl halide polymers are produced in a unified, cyclic process using the following interrelated steps:

(A) Polymerizing a first monomer mixture containing about 60 percent to 100 percent by weight of a vinyl halide and 0 to 40 percent by weight of an ethylenically-unsaturated comonomer that is copolymerizable with said vinyl halide in the presence of a free radical generating polymerization initiator and a suspending or dispersing agent at a temperature in the range of about 50° C. to 75° C. until at least about 90 percent by weight of the monomer mixture has been polymerized;

(B) Separating the unreacted monomers from the polymerized product;

(C) Combining said recovered unreacted monomers with amounts of fresh vinyl halide and fresh comonomer sufficient to form a second monomer mixture that contains substantially the same amounts of vinyl halide and comonomer that were present in the first monomer mixture;

(D) Polymerizing said second monomer in the presence of about 0.05 percent to 1 percent, based on the weight of said second monomer mixture, of a reducing agent and in the presence of a free radical generating polymerization initiator and a suspending or dispersing agent at a temperature in the range of about 50° C. to 75° C. to form a product mixture containing at least about 80 percent by weight of vinyl halide polymer; and (E) Repeating steps B, C, and D.

As used herein, the term "fresh monomer" means a monomer that has not previously been used in a polymerization reaction; "recovered monomer" is unreacted monomer that has been recovered from a polymerization reaction and has not undergone any subsequent purification; and "purified monomer" is recovered monomer that has been distilled or otherwise purified to remove from it the small amounts of polymerization by-products that interfere with subsequent polymerization reactions.

The process of this invention may be used in the production of a wide variety of vinyl halide polymers. These include vinyl halide homopolymers as well as polymers formed by the polymerization of a vinyl halide with an essentially water-insoluble ethylenically-unsaturated monomer that is copolymerizable therewith. Suitable comonomers include vinyl acetate, vinyl propionate, vinyl stearate, vinyl benzoate, styrene, methyl methacrylate, ethyl acrylate, allyl acrylate, acrylamide, acrylonitrile, methacrylonitrile, vinylidene chloride, dialkyl fumarates and maleates, and the like. The vinyl halide is ordinarily and preferably vinyl chloride. When one of the aforementioned comonomers is used, it is generally preferred that the monomer mixture contain at least 60 percent by weight of the vinyl halide. Particularly advantageous results have been obtained using monomer mixtures that contained about 80 percent to 90 percent by weight of vinyl chloride and 10 percent to 20 percent by weight of vinyl acetate.

The reducing agents that can be used in the practice of this invention are those that are at least partially soluble in the aqueous polymerization systems that are ordinarily used for the polymerization of vinyl halides. These include, for example, sodium, potassium, ammonium, ferrous, stannous, and cuprous sulfites, bisulfites, metabisulfites, hydrosulfites, formaldehydesulfoxylates, and thiosulfates; pyrogallol; ascorbic acid; polyethylene polyamines; and the like. A single reducing agent or a mixture of two or more of these reducing agents can be used in the processes of this invention. In most cases about 0.05 percent to 1 percent, based on the weight of the monomer mixture, is used. It is generally preferred to use about 0.1 percent to 0.3 percent, based on the weight of the monomer mixture of sodium bisulfite.

The polymerization reactions of this invention are carried out in the conventional manner. The monomers are polymerized at a temperature in the range of about 50° C. to 75° C. in the presence of about 0.005 percent to 1 percent, based on the weight of the monomers, of a free radical generating polymerization initiator, such as lauroyl peroxide, benzoyl peroxide, diisopropylperoxy, bicarbonate, tertiary butyl peroxypivalate, azobisisobutyronitrile, and the like, and about 0.05 percent to 1.5 percent, based on the weight of the monomers, of a suspending or dispersing agent, such as methylcellulose, gelatin, hydrolyzed polyvinyl acetate, vinyl acetate-maleic anhydride copolymers, and the like. In addition, the polymerization systems generally contain about 0.05 percent to 2 percent, based on the weight of the monomers, of a chain-transfer agent, such as dichloroethylene, trichloroethylene, and other chlorinated hydrocarbons and alkyl mercaptans. The polymers produced may be dried by spray-, drum-, or tray-drying techniques or by any other known technique for drying polymeric materials. Common additives, such as plasticizers, pigments, fillers, heat and light stabilizers, and the like, may be added in the amounts ordinarily used for these purposes to modify the properties of the polymers.

The polymers prepared by the process of this invention may be used in the production of coatings, films, and shaped articles by molding, extruding, calendering, solvent-casting, and other processes of treatment and fabrication commonly applied to vinyl halide polymers. These polymers may also be compounded or blended with other polymeric materials.

Following the polymerization reaction, the unreacted monomers are separated from the polymeric product, usually by condensation techniques. The recovered monomer mixture generally contains about 60 percent to 99 percent by weight of vinyl halide, 0 to 40 percent by weight of a comonomer, and small amounts of by-products of the polymerization reaction.

Following analysis of the recovered monomer mixture, sufficient amounts of fresh vinyl halide and fresh comonomer are combined with the recovered monomers to form a monomer mixture containing the desired amounts of vinyl halide and comonomer. This mixture contains about 10 percent to 90 percent by weight and preferably about 15 percent to 50 percent by weight of recovered monomers, the remainder being fresh vinyl halide or both fresh vinyl halide and fresh comonomer. The monomer mixture so formed is then polymerized in the presence of a reducing agent, free radical generating polymerization initiator, and suspending or dispersing agent to form additional amounts of polymer.

The invention is further illustrated by the examples that follow. In these examples all parts and percentages are parts by weight and percentages by weight.

EXAMPLES 1–4

A series of polymers was prepared by heating in a stirred autoclave the polymerization systems set forth in Table I. Samples were removed periodically, and their degree of polymerization was determined by isolating and weighing the polymer they contained.

In each of the Examples 2–4 the amounts of fresh vinyl chloride, fresh vinyl acetate, and recovered monomers used were selected to provide monomer mixtures containing 83.0 parts of vinyl chloride and 17.0 parts of vinyl acetate. The recovered monomer mixture used in Example 2 contained about 26.6 percent of vinyl acetate and 73.4 percent of vinyl chloride; that used in Example 3 contained about 19.3 percent of vinyl acetate, and 80.7 percent of vinyl chloride; and that used in Example 4 contained about 19.8 percent of vinyl acetate and 80.2 percent of vinyl chloride.

The degrees of polymerization of the monomer mixtures at intervals ranging from 2 to 10 hours are set forth in Table I.

TABLE I

| | Ex. 1 | Ex. 2 | Ex. 3 | Ex. 4 |
|---|---|---|---|---|
| Polymerization system (parts): | | | | |
| Vinyl chloride (fresh) | 83.0 | 72.0 | 47.5 | 13.0 |
| Vinyl acetate (fresh) | 17.0 | 13.0 | 8.5 | |
| Mixture of vinyl chloride and vinyl acetate (recovered) | | 15.0 | 44.0 | 87.0 |
| Deionized water | 180.0 | 180.0 | 180.0 | 180.0 |
| Lauroyl peroxide | 0.13 | 0.13 | 0.13 | 0.13 |
| Gelatin | 1.25 | 1.25 | 1.25 | 1.25 |
| Trichloroethylene | 0.8 | 0.69 | 0.46 | 0.12 |
| Sodium bisulfite | 0.2 | 0.1 | 0.13 | 0.2 |
| Degree of conversion, percent: | | | | |
| 2 hours | 22.5 | | | |
| 4 hours | 53.5 | 53.0 | | |
| 6 hours | 83.8 | | | |
| 7 hours | 91.5 | | | |
| 8 hours | 95.0 | 90.0 | 83.0 | 77.5 |
| 9 hours | | 92.5 | 87.0 | 80.0 |
| 10 hours | | 93.5 | 89.5 | 82.5 |

COMPARATIVE EXAMPLES A–D

For comparative purposes, a series of polymerization reactions was carried out that was similar to that described in Examples 1–4 except that sodium bisulfite was not included in the polymerization system. As was the case in Examples 1–4, each of the monomer mixtures used in Comparative Examples A–D contained 83.0 parts of fresh and recovered vinyl chloride and 17.0 parts of fresh and recovered vinyl acetate. The recovered monomer mixtures used in Comparative Examples B–D had the same composition as those used in Examples 2–4, respectively.

The polymerization systems used and their degrees of conversion at intervals ranging from 2 to 10 hours are set forth in Table II.

TABLE II

| | Comp. Ex. A | Comp. Ex. B | Comp. Ex. C | Comp. Ex. D |
|---|---|---|---|---|
| Polymerization system (parts): | | | | |
| Vinyl chloride (fresh) | 83.0 | 72.0 | 47.5 | 13.0 |
| Vinyl acetate (fresh) | 17.0 | 13.0 | 8.5 | |
| Mixture of vinyl chloride and vinyl acetate (recovered) | | 15.0 | 44.0 | 87.0 |
| Deionized water | 180.0 | 180.0 | 180.0 | 180.0 |
| Lauroyl peroxide | 0.13 | 0.13 | 0.13 | 0.13 |
| Gelatin | 1.25 | 1.25 | 1.25 | 1.25 |
| Trichloroethylene | 0.8 | 0.69 | 0.46 | 0.12 |
| Degree of Conversion, percent: | | | | |
| 2 hours | 22.5 | | | |
| 4 hours | 53.5 | 50.5 | 49.0 | 47.0 |
| 6 hours | 83.8 | | | |
| 7 hours | 91.5 | | | |
| 8 hours | 95.0 | 81.5 | 78.0 | 75.0 |
| 9 hours | | 85.0 | 82.5 | 77.0 |
| 10 hours | | 88.0 | 85.0 | 78.5 |

From the data in Tables I and II it will be seen that the addition of a small amount of sodium bisulfite to a monomer mixture containing both fresh and recovered vinyl chloride and vinyl acetate results in a reduction in the time required to reach a given degree of conversion as well as in an increase in the overall degree of conversion. The addition of sodium bisulfite to a monomer mixture that does not contain recovered monomers has no effect on the rate of polymerization or the overall degree of conversion of the monomers to the polymer (Ex. 1 and Comp. Ex. A).

Each of the other reducing agents hereinbefore mentioned can be used in a similar manner to increase the rate of polymerization of vinyl halide monomer mixtures that contain recovered monomers.

The terms and expressions which have been employed are used as terms of description and not of limitation. There is no intention in the use of such terms and expressions of excluding any equivalents of the features shown and described or portions thereof; it is recognized, however, that various modifications are possible within the scope of the invention claimed.

What is claimed is:

1. A cyclic, unified process for the production of vinyl halide polymers that comprises the following sequential steps:
    (A) Polymerizing a first monomer mixture containing about 60 percent to 100 percent by weight of a vinyl halide and 0 to 40 percent by weight of an ethylenically-unsaturated comonomer that is copolymerizable with said vinyl halide in the presence of a free radical generating polymerization initiator and a suspending or dispersing agent at a temperature in the range of about 50° C. to 75° C. until at least about 90 percent by weight of the said first monomer mixture has been polymerized;
    (B) Separating the unreacted monomers from the polymerized product;
    (C) Combining said recovered unreacted monomers with amounts of fresh vinyl halide and fresh comonomer that are sufficient to form a second monomer mixture that contains substantially the same amounts of vinyl halide and comonomer that were present in the first monomer mixture, said second monomer mixture containing about 10 percent to 90 percent by weight of recovered monomer and 10 percent to 90 percent by weight of fresh monomer;
    (D) Polymerizing said second monomer mixture in the presence of about 0.05 percent to 1 percent, based on the weight of the second monomer mixture, of a reducing agent and in the presence of a free radical generating polymerization initiator and a suspending or dispersing agent at a temperature in the range of about 50° C. to 75° C. to form a product mixture containing at least about 80 percent by weight of the vinyl halide polymer; and
    (E) Repeating Steps B, C, and D.

2. The process of claim 1 wherein the vinyl halide monomer used in Steps A and C is vinyl chloride.

3. The process of claim 1 wherein the first and second monomer mixtures contain about 80 to 90 percent by weight of vinyl chloride and 10 to 20 percent by weight of vinyl acetate.

4. The process of claim 1 wherein sodium bisulfite is the reducing agent used in Step D.

5. The process of claim 1 wherein the polymerization of Step D is carried out in the presence of 0.1 percent to 0.3 percent, based on the weight of the polymer mixture of sodium bisulfite.

6. The process of claim 1 wherein the second monomer mixture (Step C) contains about 15 percent to 50 percent by weight of recovered monomer and 50 percent to 85 percent by weight of fresh monomer.

7. In the process for the polymerization of a monomer mixture containing about 60 percent to 100 percent by weight of a vinyl halide and 0 to 40 percent by weight of an ethylenically-unsaturated monomer that is copolymerizable with said vinyl halide, said monomer mixture containing from about 10 percent to 90 percent by weight of unpurified monomers recovered from a previous polymerization reaction, in the presence of a free radical generating initiator and a suspending or dispersing agent at a temperature in the range of about 50° C. to 75° C., the improvement which comprises carrying out the polymerization of said monomer mixture in the presence of about 0.05 percent to 1.0 percent, based on the weight of the monomer mixture, of a reducing agent.

8. The process of claim 7 wherein 0.1 percent to 0.3 percent, based on the weight of the monomer mixture, of the reducing agent is used.

9. The process of claim 7 wherein the reducing agent is sodium bisulfite.

10. The process of claim 7 wherein the vinyl halide in the monomer mixture is vinyl chloride.

11. The process of claim 7 wherein the monomer mixture contains about 80 to 90 percent by weight of vinyl chloride and 10 to 20 percent by weight of vinyl acetate.

12. The process of claim 7 wherein the monomer mixture contains about 15 percent to 50 percent by weight of unpurified recovered monomers.

References Cited

UNITED STATES PATENTS

| | | | |
|---|---|---|---|
| 2,604,468 | 7/1952 | Underwood et al. | 260—92.8 |
| 2,836,585 | 5/1958 | Hill | 260—92.8 |
| 2,875,187 | 2/1959 | Gerhard | 260—92.8 |
| 2,979,492 | 4/1961 | Governale et al. | 260—92.8 |
| 3,004,013 | 10/1961 | Kircher et al. | 260—92.8 |
| 3,125,553 | 3/1964 | Bingham | 260—87.1 |
| 3,281,377 | 10/1966 | Lederer et al. | 260—2.5 |
| 3,403,137 | 9/1968 | Andersen et al. | 260—87.5 |

JOSEPH L. SCHOFER, Primary Examiner

C. A. HENDERSON, JR., Assistant Examiner

U.S. Cl. X.R.

260—78.5, 85.5, 87.5, 87.7, 88.1, 92.8